US009628420B1

United States Patent
Pauley, Jr. et al.

(10) Patent No.: US 9,628,420 B1
(45) Date of Patent: Apr. 18, 2017

(54) METHOD AND APAPRATUS FOR CONTENT, ENDPOINT, AND PROTOCOL MAN-IN-THE-MIDDLE USER INTERFACE

(75) Inventors: Wayne A. Pauley, Jr., Hudson, NH (US); Stephen J. Todd, Shrewsbury, MA (US); Michel F. Fisher, Natick, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 690 days.

(21) Appl. No.: 13/536,504

(22) Filed: Jun. 28, 2012

Related U.S. Application Data (63) Continuation-in-part of application No. 13/247,423, filed on Sep. 28, 2011.

(51) Int. Cl.
*H04L 12/58* (2006.01)
*H04L 29/06* (2006.01)

(52) U.S. Cl.
CPC .......... *H04L 51/16* (2013.01); *H04L 63/1466* (2013.01)

(58) Field of Classification Search
CPC ....................................................... H04L 51/16
See application file for complete search history.

(56) References Cited

U.S. PATENT DOCUMENTS

| | | | | |
|---|---|---|---|---|
| 7,454,716 B2 * | 11/2008 | Venolia | | 715/853 |
| 8,484,460 B1 * | 7/2013 | Vaughn | | H04L 63/0823 |
| | | | | 713/155 |
| 8,566,578 B1 * | 10/2013 | Banerjee | | H04L 9/088 |
| | | | | 709/217 |
| 2004/0153456 A1 * | 8/2004 | Charnock et al. | | 707/10 |
| 2006/0236391 A1 * | 10/2006 | Kim | | H04L 63/1466 |
| | | | | 726/22 |
| 2008/0159146 A1 * | 7/2008 | Claudatos et al. | | 370/235 |
| 2012/0331066 A1 * | 12/2012 | Fitzgerald | | 709/206 |
| 2013/0121481 A1 * | 5/2013 | Mikan | | H04L 51/10 |
| | | | | 379/88.14 |

OTHER PUBLICATIONS

Marlinspike; New Tricks for Defeating SSL in Practice; 2009; Retrieved from the Internet <URL: blackhat.com/presentations/bh-dc-09/Marlinspike/BlackHat-DC-09-Marlinspike-Defeating-SSL.pdf>; pp. 1-114 as printed.*

* cited by examiner

*Primary Examiner* — Saleh Najjar
*Assistant Examiner* — Simon Kanaan
(74) *Attorney, Agent, or Firm* — Krishnendu Gupta; Robert Kevin Perkins (57) ABSTRACT

Example embodiments of the present invention relate to a method, an apparatus and a computer-program product for friendly man-in-the-middle data stream correlation. An example method includes receiving a data stream transmitted from a source intended for a destination. A contextual analysis of portions of the data stream then may be performed, with respective portions of the data stream being correlated according to the contextual analysis.

16 Claims, 8 Drawing Sheets

METHOD AND APAPRATUS FOR CONTENT, ENDPOINT, AND PROTOCOL MAN-IN-THE-MIDDLE USER INTERFACE

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This Application is a Continuation-in-Part of U.S. patent application Ser. No. 13/247,423 entitled "METHOD AND APPARATUS FOR FRIENDLY MAN-IN-THE-MIDDLE DATA STREAM INSPECTION" filed on Sep. 28, 2011, the contents and teachings of which are incorporated herein by reference in their entirety.

This Application is related to U.S. patent application Ser. No. 13/247,549 entitled "METHOD AND APPARATUS FOR PRIVACY-RESPECTING NOTIFICATION OF SECURITY THREATS" and Ser. No. 13/247,623 entitled "METHOD AND APPARATUS FOR ENCRYPTION WITH VIEWER IDENTITY-AND CONTENT ADDRESS-BASED IDENTITY PROTECTION", filed on Sep. 28, 2011; Ser. No. 13/340,104 entitled "TIME-BASED ANALYSIS OF DATA STREAMS" and Ser. No. 13/340,007 entitled "DATA TRACKING FOR PROVENANCE AND CHAIN OF CUSTODY GENERATION", filed on Dec. 29, 2011; Ser. No. 13/436,702 entitled "METHOD AND APPARATUS FOR COOKIE ANONYMIZATION AND REJECTION" filed on Mar. 30, 2012; and Ser. No. 13/536,337, entitled "METHOD AND APPARATUS FOR MAN-IN-THE-MIDDLE AGENT-ASSISTED CLIENT FILTERING" and Ser. No. 13/536,637, entitled "DIGITAL DISAPPEARING INK", filed on even date herewith, the teachings of which are hereby incorporated by reference in their entirety.

TECHNICAL FIELD

This application relates to data privacy.

BACKGROUND

Privacy is the claim of individuals, groups or institutions to determine for themselves when, how, and to what extent information about them is communicated to others. Private information is frequently made public or semi-public via emails, blogs and postings to social networking services, such as Facebook, Twitter, LinkedIn and FourSquare, often without foresight as to the consequences of such a divulgence. It has been reported that information publicly posted to social networking services has been used in firing individuals from their employment and has been used by criminals to find targets for burglaries.

Additionally, intentionally divulged information that is intended to be maintained as private is routinely sold to advertisers and information brokers. Moreover, with the proliferation of app usage in mobile devices, additional information is available on the "information market," including users' location, age, gender, income, ethnicity, sexual orientation and political views. As recently reported by the Wall Street Journal, of 101 popular smartphone apps, 56 transmitted the device ID without the user's consent, 47 sent location information, and 5 sent age, gender and other personally identifiable information is outsiders.

SUMMARY

Example embodiments of the present invention relate to a method, an apparatus and a computer-program product for friendly man-in-the-middle data stream correlation. An example method includes receiving a data stream transmitted from a source intended for a destination. A contextual analysis of portions of the data stream then may be performed, with respective portions of the data stream being correlated according to the contextual analysis.

BRIEF DESCRIPTION OF THE DRAWINGS

The above and further advantages of the present invention may be better under stood by referring to the following description taken into conjunction with the accompanying drawings in which.

DETAILED DESCRIPTION

As the number of Internet-connected devices in the home and the enterprise continues to rise, the concept of privacy is increasingly caught in the midst of two divergent forces: that individual, group or institution's likely desire to maintain information as private, and the increasing vulnerability of such information to a privacy breach or unintended disclosure. Internet-connected devices in the household/enterprise may include personal computers, laptop computer, televisions, audiovisual receiver, music players, radio, appliances and gaming systems. While many of these devices have a method to block Internet access wholesale, they lack finer-grain controls for limiting Internet access.

For example, current methods for controlling the disclosure of private information include centralized devices that block wholesale access to a particular resource by using source/destination routing filters, regardless of content that is being sent to or received from that resource. Further, while there are some endpoint-based protections that examine content, they are one-off per client, require an administrator to set up and manage each device manually, and do not protect all device types (i.e., are only available on certain platforms). Moreover, while many of these devices provide logging capabilities, the rapidly increasing number of such devices and the amount of information they log removes from the realm of possibility an administrator's ability to police those logs to determine, albeit after the fact, private information that was disclosed.

Part of the content flowing over the network is cookies/beacons. Cookies provide an unknown leakage of private information from internal systems to external networks. One example of a cookie is a key-click cookie, which enables marketing for every click that a user is making and is often associated with free applications. That cookie may contain sensitive information like name, age, sex, location, account numbers, etc. Malware can hijack cookies and accelerate the leakage of information by continually uploading sensitive information at a very high rate. Web beacons leak user activity between websites out to external sources.

As understood in the art, these objects are buffers that may be filtered and examined. However, traditional packet inspectors typically only look at fingerprint, source, and destination information, but do not inspect at the content level. Therefore, content-aware drill-down analysis of cookies/beacons may enable an administrator to decipher cookie content and establish one or more policies to either block or anonymize cookies/beacons. Further, the pace and frequency of cookies can also be viewed.

Therefore, a centralized point of control is desirable that performs a lexical analysis of cookies/beacons in a data stream. Within the household, for example, a broadband router is generally a common access point for most home-based Internet-connected devices. In other words, example embodiments of the present invention provide an intelligent layer implemented, for example, in the router (or as a standalone device) that can inspect the payload of a cookie/beacon in a data stream for keywords and employ a blocking or masking mechanism to protect unauthorized or potentially harmful data from escaping the household (i.e., intentional or accidental), irrespective of source-type (i.e., agent-less) and in a manner transparent to the destination.

Example embodiments of the present invention specifically targets cookies and beacons that flow through a system, and historically track cookie and beacon traffic in order to perform drill-down inspection on the contents. This inspection allows for detection of sensitive information such as credit cards, location, and any other personal info, as well as the potential presence of malware which is performing unusual behavior within the private system.

Figure 1:
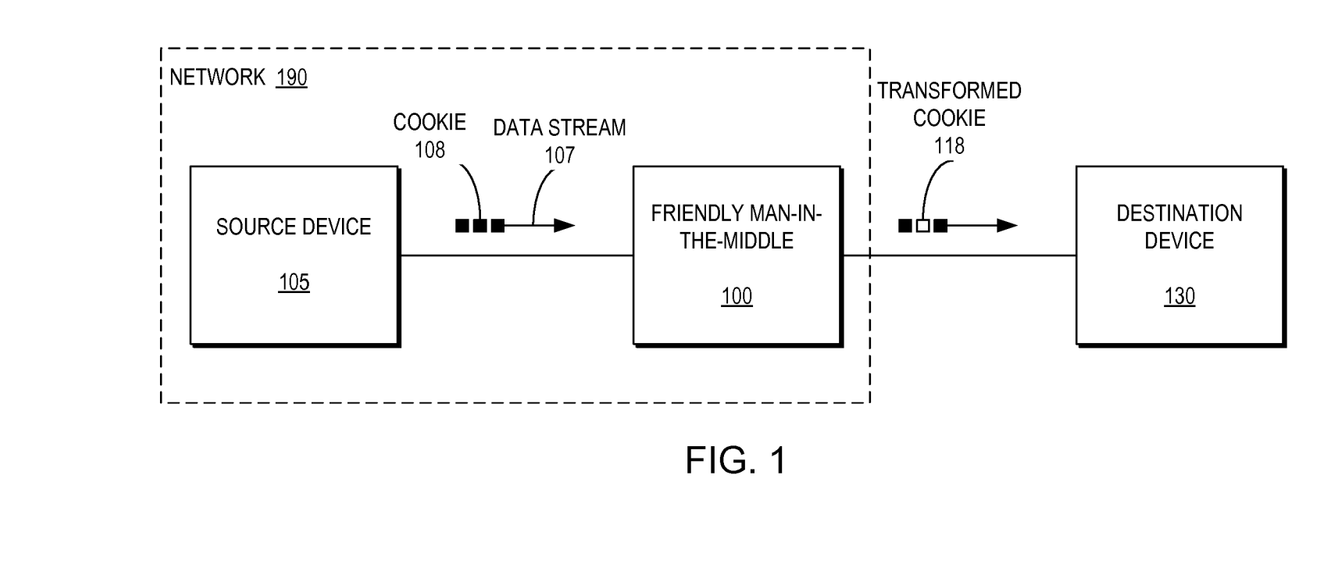
FIGS. 1 and 2 are block diagrams illustrating an example embodiment of the present invention deployed in a network environment.

FIG. 1 is a block diagram illustrating an example embodiment of the present invention 100 in a network environment 190. As illustrated in FIG. 1, the network 190 includes a source device 105 that may transmit a data stream 107, including a cookie 108, intended for a destination (e.g., destination device 130). However, a friendly (i.e., blessed) man-in-the-middle (FMITM) 100 receives (i.e., intercepts) the data stream 107 before the data stream escapes the network 190 toward the destination device 130. As will be discussed in greater detail below, the FMITM 100 performs a lexical analysis of content (i.e., payload) of cookies 108 included in the data stream 107. The FMITM 100 then forwards the cookie 108 out of the network 190 to the intended destination device 130 as a transformed data stream 118 according to the lexical analysis. It should be noted that, in certain embodiments, the transformed data stream 118 may be a blocking of the cookie 108 or an anonymization of the cookie 108.

Figure 2:
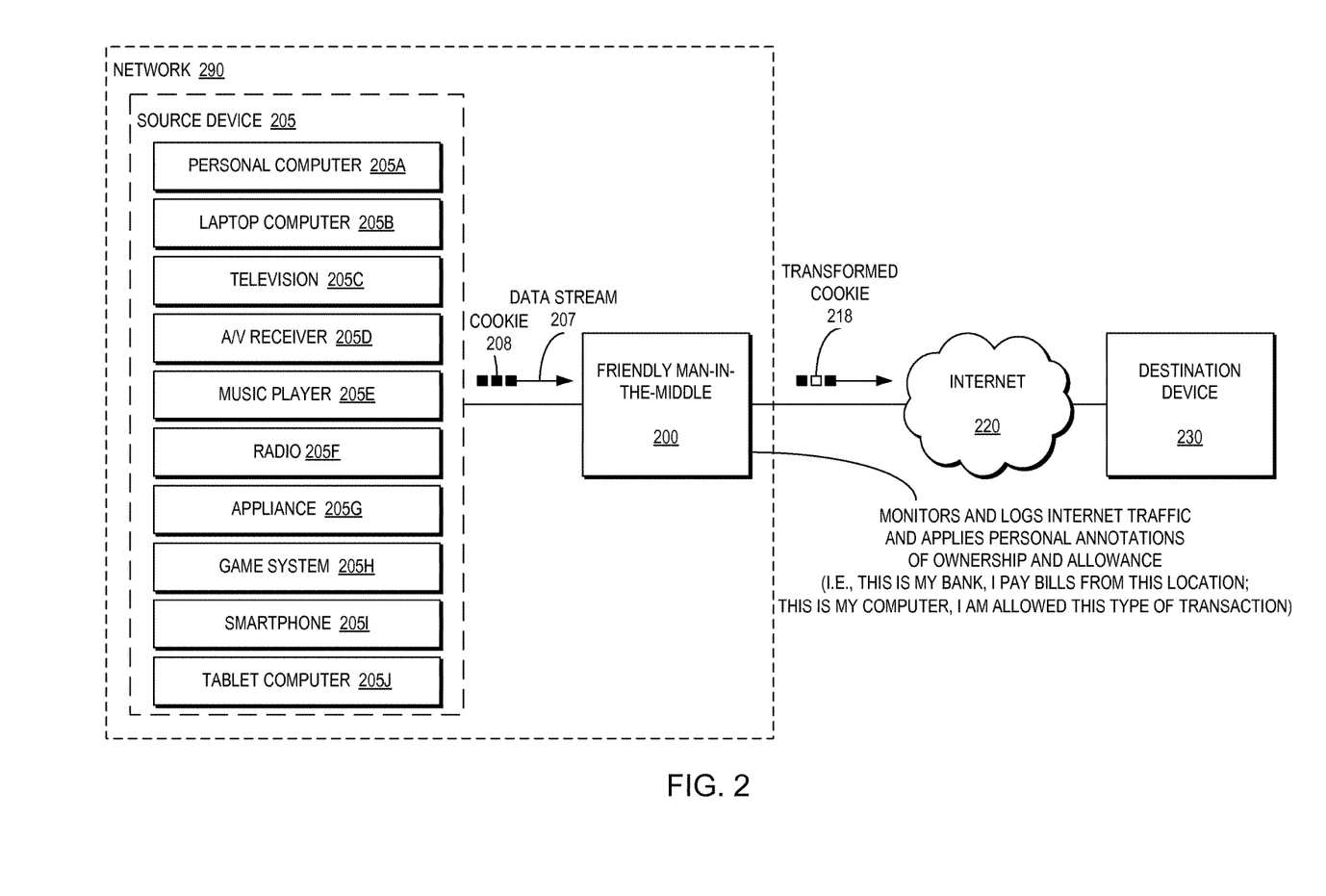

FIG. 2 is a block diagram illustrating an example embodiment of the present invention 200 in a network environment 290. As illustrated in FIG. 2, the network 290 includes a source device 205 (e.g., personal computer 205A, laptop computer 205B, television 205C, A/V receiver 205D, music player 205E, radio 205F, appliance 205G, game system 205H, smartphone 205I, and table computer 205J) that may transmit a data stream 207, including a cookie 208, intended for a destination (e.g., destination device 230). However, a FMITM 200 receives (i.e., intercepts) the data stream 207 before the data stream escapes the network 290 toward the destination device 230 over the Internet 220. It should be understood that the FMITM 200 may intercept both wired (e.g., over Ethernet) and wireless (e.g., over WiFi) data streams 207 in the network 290.

Likewise, the FMITM 200 may include additional hardware, such as a picocell, from a cellular telephony carrier to permit the FMITM 200 to intercept wireless communications (i.e., voice and data) from cellular telephones, tablet computers and the like connected to the cellular telephony carrier (e.g., over 3G or 4G connections). The FMITM 200 then forwards the cookie 208 out of the network 290 to the intended destination device 230 as a transformed data stream 218 according to the lexical analysis. In other embodiments, the FMITM 200 may include hardware to act as a repeater for the cellular telephony carrier so that it may intercept wireless communications and forward them back to the cellular telephony carrier's network (e.g., 3G or 4G network).

Man-In-The-Middle Content, Endpoint, and Protocol User Interface

Traditional user interfaces display information based on IP addresses and ports and provide blocking capabilities based on those IP addresses and ports. However, certain communications platforms, such as Skype, may split communications across a plurality of ports, "walk" the ports to find available ports, or use a generic communications protocol. Accordingly, traditional methods of blocking communications may fail because the communications platform may circumvent blocked ports or IP addresses and blocking the protocol used may have unintended consequences to other system resource.

Example embodiments of the present invention overcome these and other obstacles by providing a user interface configured to display information based on what kind of content is included, the endpoints of the communication, and a correlation of the content signature to content type. Accordingly, with communications correlated and identified, communications may be blocked based on the content and the context of the communications.

Figure 3:
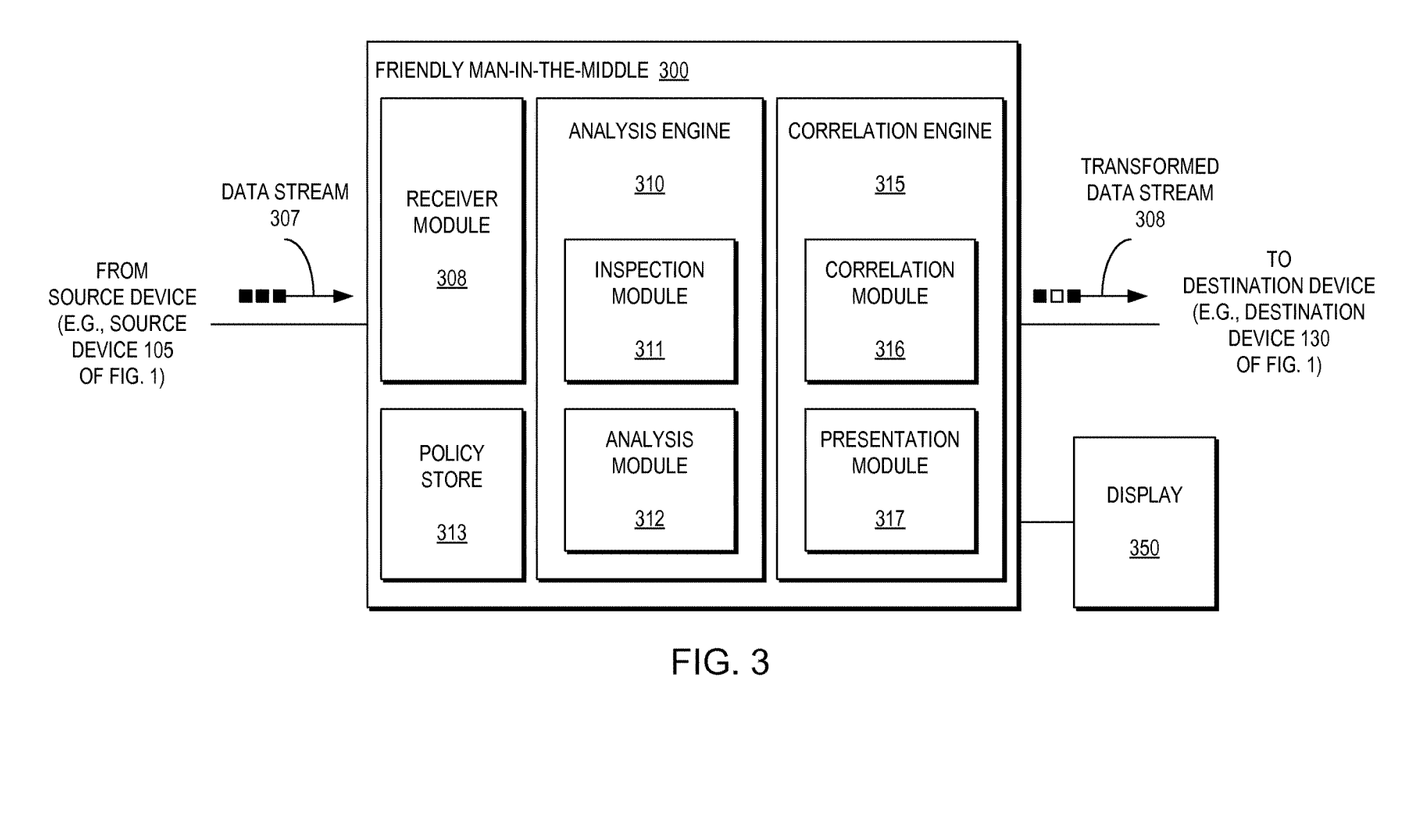
FIG. 3 is a block diagram illustrating a man-in-the-middle according to example embodiments of the present invention.
Figure 4A:
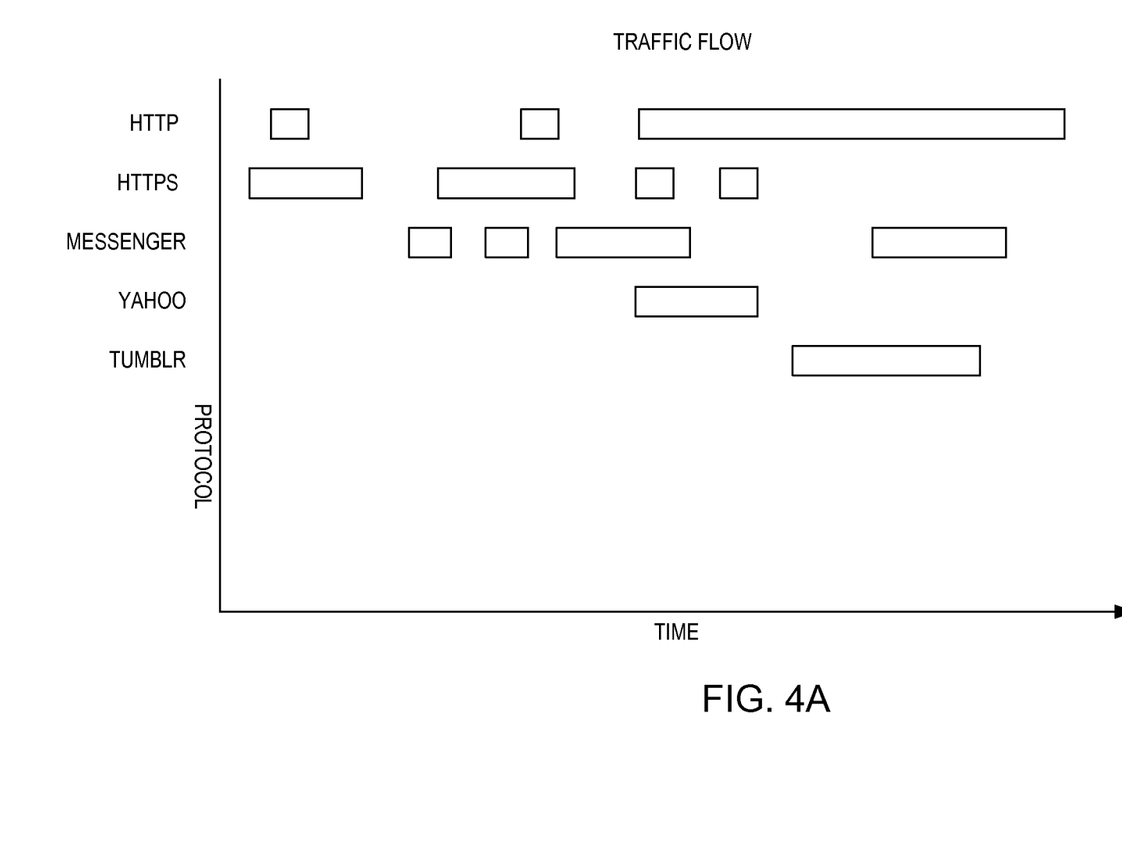
FIGS. 4A-4C are block diagrams of a user interface according to example embodiments of the present invention.
Figure 4B:
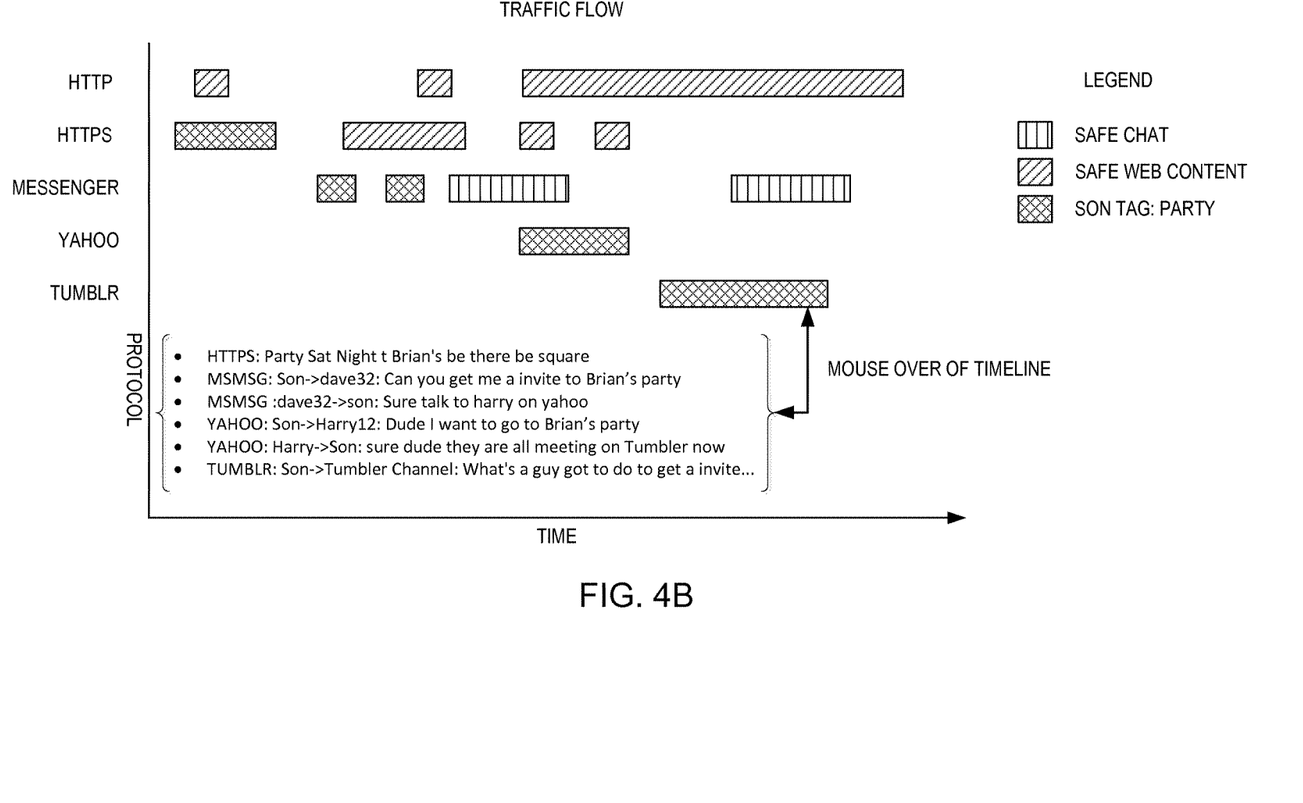
Figure 4C:
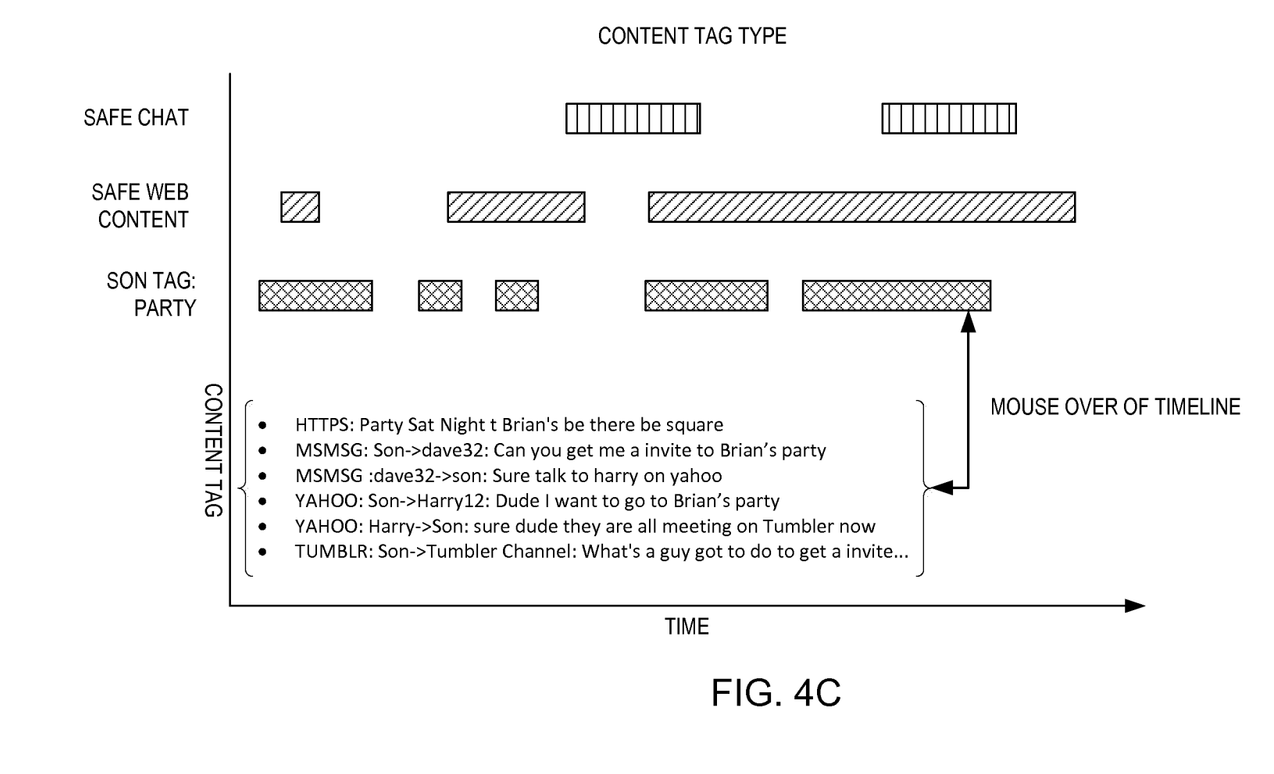

FIG. 3 is a block diagram illustrating a man-in-the-middle 300 according to example embodiments of the present invention. FIGS. 4A-4C are block diagrams of a user interface according to example embodiments of the present invention. FIGS. 5-8 are flow diagrams illustrating methods according to example embodiments of the present invention. FIGS. 3-8 may be described in conjunction below.

Figure 5:
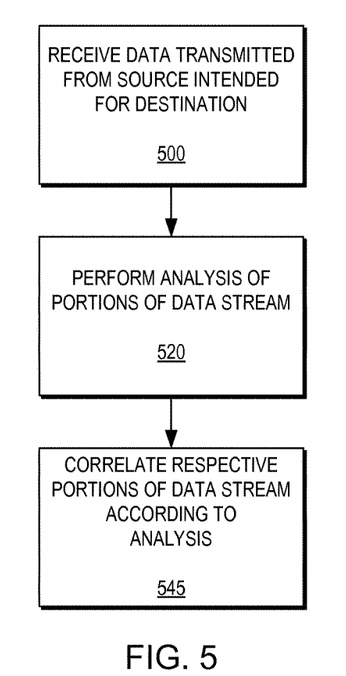
FIGS. 5-8 are flow diagrams illustrating methods according to example embodiments of the present invention.

As illustrated in FIGS. 3 and 5, a receiver module 308 of the FMITM 300 may receive a data stream 307 transmitted from a source (e.g., source 105 of FIG. 1) intended for a destination (e.g., destination device 130 of FIG. 1) (500). An analysis engine 310 then may perform an analysis of portions of the data stream 307 (520). Based on the analysis, a correlation engine 315 may correlate respective portions of the data stream 307 according to the analysis by the analysis engine 310 (545).

Figure 6:
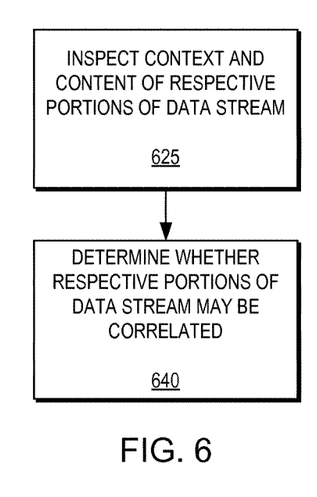

In certain embodiments as illustrated in FIGS. 3 and 6, to perform the analysis of portions of the data stream 307, the analysis engine 310 may include an inspection module 311 that may inspect context and content of respective portions of the data stream 307 (625). An analysis module 312 of the analysis engine 310 then may determine whether the context and the content of the respective portions of the data stream 307 may be correlated (640).

Figure 7:
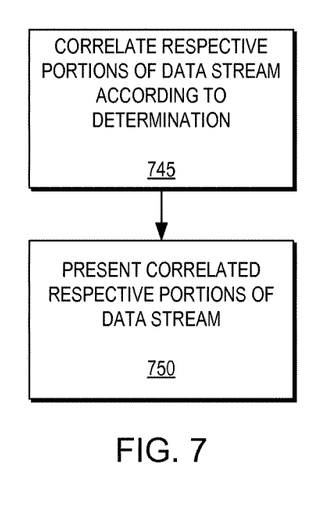

In other embodiments as illustrated in FIGS. 3 and 7, to correlate respective portions of the data stream 307 according to the analysis, the correlation engine 315 may include a correlation module 316 that may correlate respective portions of the data stream 307 according to the determination of whether the context and the content of the respective portions of the data stream 307 may be correlated (745). A presentation module 317 of the correlation engine 315 then may present the correlated respective portions of the data stream 307 (750). The correlated portions of the data stream 307 may be presented in a graphical user interface, as illustrated in FIGS. 4A-4C Likewise, the correlation engine 315 may correlate respective portions of the data stream 307 according to the determination of whether the context and the content of the respective portions of the data stream may be correlated according to a policy from a policy store 313. It should be understood that the policy store may include keywords provided by an administrator, user IDs, a prepackaged combination set of keywords, or a third party service (e.g., TRUSTe).

Figure 8:
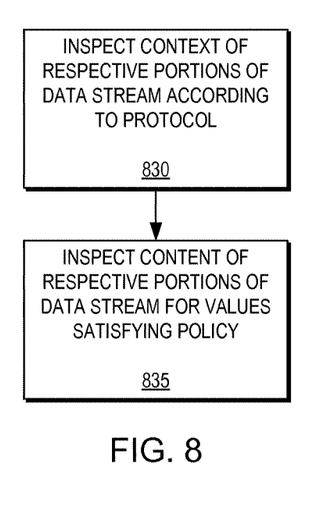

As illustrated in FIGS. 3, 4B, and 8, the inspection module 311 may inspect context of respective portions of the data stream 307 according to a protocol associated with each respective portion of the data stream 307 (830). For example, as illustrated in FIG. 4A, a data stream received from a source may include communications sent via a plurality of protocols (e.g., HTTP, HTTPS, Messenger, Yahoo, and Tumblr). The inspection module 311 may inspect the context of the communications from the source. For example, the inspection module 311 may determine the protocol used by each portion of the data stream.

Likewise, the inspection module 311 may inspect content of respective portions of the data stream 307 for values satisfying a policy (835). For example, as illustrated in FIG. 4B, the inspection module 311 may inspect the content of the portions of the data stream 307 and identify the content (i.e., categorize the content). As illustrated in FIG. 4A, the inspection module 311 may identify the content as "safe chat," "safe web content," or "son tag: party."

It should be understood that the policy store 313 may include policies to identify certain portions of the data stream based on the context or the content of the communications included in the portions of the data stream. For example, a parent may desire to have a policy in place to identify an illicit party being planned and create such a policy to notify the parent regarding, for example, a stream of communications, which may use disparate communications mediums or protocols, about the communications.

For example, as illustrated in FIG. 4A, a series of communications received by the FMITM 300 is difficult to identify as a conversation because the communications are broken down by protocol and there is no context or content information available regarding the communications. For example, without the context and content information, it is impossible to determine whether a conversation has occurred across disparate communications mediums or protocols.

However, as illustrated in FIG. 4B, the FMITM 300 may identify communications between a child and his friends regarding a party using a plurality of communications mediums and protocols. A first portion of the data stream 307 received by the FMITM may be sent via HTTPS (i.e., context) and satisfy the policy "son tag: party" (i.e., based on the content, "Party Sat Night t Brian's be there be square"). This may be the child's first communication received regarding the party, sparking the child's interest.

In response, the child may contact a friend, Dave, to get an invitation. However, this second communication may be sent via a second communication medium or protocol, such as a Microsoft Messenger. Based on the content of the message (i.e., "Son→dave32: Can you get me a invite to Brian's party") the FMITM identifies this portion of the data stream 307 as being related to the first communication.

Likewise, a third communication received by the son from his friend, Dave, via the second communication medium or protocol may be correlated based on the context (e.g., a response to an initial communication from the son, "dave32→son) and its content (i.e., "Sure talk to harry on yahoo").

The FMITM 300 then may receive a fourth portion of the data stream, a communication from the son to Harry (e.g., Son→Harry12). Based on the context (i.e., as a subsequent communication to Dave's message mentioning Yahoo) and the content (i.e., "Dude I want to go to Brian's party) satisfying the policy, the FMITM may correlate this fourth portion of the data stream.

Similarly, the Harry's response to the son (i.e., Harry→Son) stating, "sure dude they are all meeting on Tumblr now" may be correlated based on its context as a response to the son's message to Harry using Yahoo.

Finally, the son's comment on the Tumblr Channle may be correlated based on its context as a subsequent communication to Harry's message mentioning Tumblr and its content, "What's a guy go to do to get a invite . . . " satisfying the policy "son tag: party."

As illustrated in FIG. 4C, the FMITM 300 may present a comprehensive correlated user interface that correlates respective portions of the data stream regardless of the protocol associated with each respective portion of the data stream. For example, although a plurality of communications medium and protocols were use by the son in the example above to get an invitation to a party, example embodiments of the present invention may display the communications as a correlated series regardless of protocol that satisfies the policy (e.g., son tag: party). Likewise, "mousing over" the correlated communications may present the correlated respective portions of the data stream regardless of the protocol associated with each respective portion of the data stream and display the full conversation correlated by the FMITM.

Further, it should be understood that, although communications increasingly as encrypted, the FMITM may be disposed in the communications path such that it may intercept keys associated with an encrypted portion of the data stream. Then, when the FMITM receives the encrypted portion of the data stream it is able to decrypt the encrypted portion of the data stream using the received key.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 9:
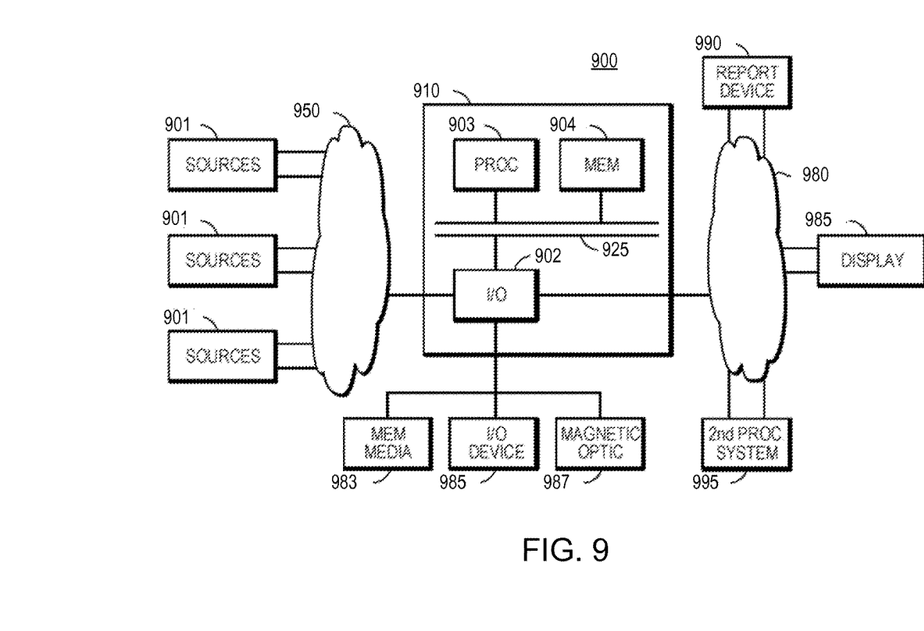
FIG. 9 is a block diagram of an example embodiment apparatus according to the present invention.

FIG. 9 is a block diagram illustrating an apparatus, such as a computer 910 in a network 900, that may utilize the techniques described herein according to an example embodiment of the present invention. The computer 910 may include one or more I/O ports 902, a processor 903, and memory 904, all of which may be connected by an interconnect 925, such as a bus. The I/O port 902 may provide connectivity to memory media 983, I/O devices 985, and drives 987, such as magnetic or optical drives. When the program code is loaded into memory 904 and executed by the computer 910, the machine becomes an apparatus for practicing the invention. When implemented on one or more general-purpose processors 903, the program code combines with such a processor to provide a unique apparatus that operates analogously to specific logic circuits. As such, a general purpose digital machine can be transformed into a special purpose digital machine.

Figure 10:
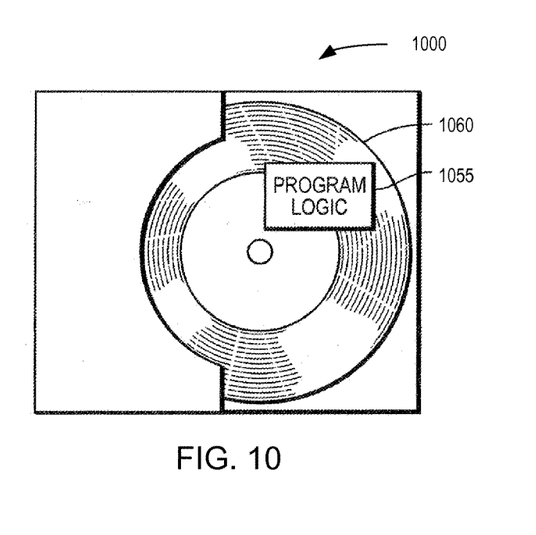
FIG. 10 is an illustration of an example embodiment of the present invention as embodied in program code.

FIG. 10 is a block diagram illustrating a method embodied on a computer readable storage medium 1060 that may utilize the techniques described herein according to an example embodiment of the present invention. FIG. 10 shows Program Logic 1055 embodied on a computer-readable medium 1060 as shown, and wherein the Logic is encoded in computer-executable code configured for carrying out the methods of this invention and thereby forming a Computer Program Product 1000.

The logic for carrying out the method may be embodied as part of the aforementioned system, which is useful for carrying out a method described with reference to embodiments shown in, for example, FIGS. 1-8. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for friendly man-in-the-middle data stream correlation, the method comprising:
    intercepting a plurality of respective data streams associated with corresponding respective different communications services at respective times that the data streams are attempting to be communicated between a first device in a network and a one or more of a plurality of second devices outside the network, the intercepting done by an intercepting device in the network, wherein the intercepting comprises intercepting the plurality of data streams before the plurality of respective data streams are permitted to be communicated between the first device and any one or more of the second devices;
    performing by the intercepting device an analysis of context and content of the plurality of respective data streams, the analysis determining, based at least in part on context and content of the respective data streams, whether any one or more of the data streams are part of a conversation;
    correlating a first data stream and a second data stream as being associated with a first conversation, according to the context and content of the first data stream and the second data stream; and
    permitting the first and second data streams to be communicated between the first device and any one or more respective second devices associated with the first conversation, if the first and second data streams satisfy a predetermined condition.

2. The method of claim 1 wherein correlating a first respective data stream and a second respective data stream according to the context and content of the first respective data stream and the second respective data stream comprises:
    correlating the first respective data stream and the second respective data stream according to a determination of whether the context and the content of the first respective data stream and the second respective data stream may be parts of the same conversation; and
    presenting the correlated first respective data stream and second respective data stream to a user interface.

3. The method of claim 2 wherein correlating the first respective data stream and the second respective data stream according to a determination of whether the context and the content of the first respective data stream and the second respective data stream may be correlated comprises correlating the first respective data stream and the second respective data stream according to the determination of whether the context and the content of the first respective data stream and the second respective data stream may be correlated according to a policy.

4. The method of claim 2 wherein performing by the intercepting device an analysis of context and content of respective data stream data streams comprises:
    inspecting context of respective data stream data streams according to a protocol associated with each respective data stream; and
    inspecting content of respective data streams for values satisfying a policy.

5. The method of claim 4 wherein correlating the first respective data stream and the second respective data stream according to a determination of whether the context and the content of the first respective data stream and the second respective data stream may be correlated comprises correlating the first respective data stream and the second respective data stream regardless of the respective protocols associated with the first respective data stream and the second respective data stream; and
    wherein presenting the correlated first respective data stream and second respective data stream comprises presenting the correlated first respective data stream and second respective data stream to a user interface regardless of the respective protocol associated with the first respective data stream and the second respective data stream.

6. The method of claim 1, further comprising providing a user interface configured to display information related to the intercepted plurality of respective data streams based at least in part on the type of content included in a respective data stream, one or more endpoints of a respective communication associated with a respective data stream, and a correlation of the content signature to content type.

7. An apparatus for friendly man-in-the-middle data stream correlation, the apparatus comprising:
    a receiver module configured to intercept a plurality of respective data streams associated with corresponding respective different communications services at respective times that the data streams are attempted to be communicated between a first device in a network with the apparatus and a one or more of a plurality of second devices outside the network, wherein the receiver module is configured to intercept the plurality of data streams before the plurality of respective data streams are permitted to be communicated between the first device and any one or more of the second devices;

an analysis engine configured to perform an analysis of context and content of the plurality of respective data streams to determine, based at least in part on context and content of the respective data streams, whether any one or more of the data streams is part of a conversation; and a correlation engine configured to correlate a first data stream and a second data stream as being associated with a first conversation, according to the context and content of the first data stream and the second data stream, wherein the correlation engine is configured to permit the first and second data streams to be communicated between the first device and any one or more respective second devices associated with the first conversation, if the first and second data streams satisfy a predetermined condition.

8. The apparatus of claim 7 wherein the correlation engine comprises:

a correlation module configured to correlate the first respective data stream and the second respective data steam according to a determination of whether the context and the content of the first data stream and the second respective data stream may be related as being part of a first conversation; and a presentation module configured to present the first respective data stream and second respective data stream to a user interface.

9. The apparatus of claim 8 wherein the correlation module is further configured to correlate the first respective data stream and the second respective data stream according to the determination of whether the context and the content of the first respective data stream and the second respective data stream may be correlated according to a policy.

10. The apparatus of claim 8 wherein the inspection module is configured to inspect context of respective data streams according to a protocol associated with each respective data stream, and inspect content of respective data streams for values satisfying a policy.

11. The apparatus of claim 10
wherein the correlation module is further configured to correlate the first respective data stream and the second respective data stream regardless of the respective protocols associated with the first respective data stream and the second respective data stream; and
wherein the presentation module is further configured to present the correlated first respective data stream and second respective data stream to a user interface regardless of the respective protocol associated with the first respective data stream and the second respective data stream.

12. A computer program product including a non-transitory computer-readable storage medium encoded with computer-program code that, when executed on a processor of a computer, cause the computer to perform friendly man-in-the-middle data stream correlation, the computer-program product comprising:

computer program code for intercepting a plurality of respective data streams associated with corresponding respective different communications services at respective times that the data streams are attempted to be communicated between a first device in a network intended and one or more of a plurality of second devices outside the network, the intercepting done by an intercepting device in the network;

computer program code for intercepting the plurality of data streams before the plurality of respective data streams are permitted to be communicated between the first device and any one or more of the second devices;

computer program code for performing by the intercepting device an analysis of context and content of respective data streams, the analysis determining, based at least in part on context and content of the respective data streams, whether any one or more of the data streams is part of a conversation;

computer program code for correlating a first data stream and a second data stream as being associated with a first conversation, according to the context and content of the first data stream and the second data stream; and computer program code permitting the first and second data streams to be communicated between the first device and any one or more respective second devices associated with the first conversation, if the first and second data streams satisfy a predetermined condition.

13. The computer program product of claim 12, wherein computer program code for correlating the first respective data stream and a second respective data stream according to the context and content of the first respective data stream and the second respective data stream comprises:

computer program code for correlating the first respective data stream and the second respective data stream according to a determination of whether the context and the content of the first respective data stream and the second respective data stream may be parts of the same conversation; and computer program code for presenting the correlated first respective data stream and second respective data stream to a user interface.

14. The computer program product of claim 13 wherein computer program code for correlating the first respective data stream and the second respective data stream according to a determination of whether the context and the content of the first respective data stream and the second respective data stream may be correlated comprises computer program code for correlating the first respective data stream and the second respective data stream according to the determination of whether the context and the content of the first respective data stream and the second respective data stream may be correlated according to a policy.

15. The computer program product of claim 14 wherein computer program code for performing by the intercepting device an analysis of context and content of respective data streams comprises:

computer program code fix inspecting context of respective data streams according to a protocol associated with each respective data stream; and computer program code for inspecting content of respective data streams for values satisfying a policy.

16. The computer program product of claim 15
wherein computer program code for correlating the first respective data stream and the second respective data stream according to a determination of whether the context and the content of the first respective data stream and the second respective data stream may be correlated comprises computer program code for correlating the first respective data stream and the second respective data stream regardless of the respective protocols associated with the first respective data stream and the second respective data stream; and
wherein computer program code for presenting the correlated first respective data stream and second respective data stream comprises computer program code for presenting the correlated first respective data stream and second respective data stream to a user interface regardless of the respective protocols associated with the first respective data stream and the second respective data stream.

\* \* \* \* \*